(12) United States Patent
Catry et al.

(10) Patent No.: US 7,089,631 B2
(45) Date of Patent: Aug. 15, 2006

(54) MOUNTING HOOK AND WIRE ARRAY APPARATUS AND METHOD

(75) Inventors: Pierrot Catry, Spiere (BE); Jo Pattyn, Geluwe (BE)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/611,545

(22) Filed: Jul. 1, 2003

(65) Prior Publication Data

US 2005/0000064 A1 Jan. 6, 2005

(51) Int. Cl.
*A44B 1/04* (2006.01)

(52) U.S. Cl. ............... 24/298; 24/598.4; 24/601.6; 24/265 H

(58) Field of Classification Search ............ 5/265, 5/266, 259.1, 270; 297/452.52; 24/265 H, 24/601.6, 598.4, 298
See application file for complete search history.

(56) References Cited

U.S. PATENT DOCUMENTS

| 795,661 A | 7/1905 | Staples |
| 3,076,981 A | 2/1963 | Hodges, Jr. ............... 5/351 |
| 3,175,269 A | 3/1965 | Raduns et al. |
| 3,551,282 A | 12/1970 | Hogue ..................... 161/220 |
| 3,669,498 A | 6/1972 | Meyers et al. |
| 3,938,792 A | 2/1976 | Nissen ..................... 267/69 |
| 3,977,029 A | 8/1976 | Hancock ................. 5/259 R |
| 3,992,853 A | 11/1976 | Morris ..................... 52/760 |
| 4,029,303 A * | 6/1977 | Quakenbush ............ 267/110 |
| 4,817,551 A | 4/1989 | Matson ................... 114/230 |
| 5,207,404 A | 5/1993 | Reinhard |
| 5,363,522 A | 11/1994 | McGraw ................... 5/474 |
| 6,676,218 B1 * | 1/2004 | Fujita et al. ......... 297/452.49 |

FOREIGN PATENT DOCUMENTS

FR 2582362 A * 11/1986

OTHER PUBLICATIONS

PCT International Search Report.

* cited by examiner

*Primary Examiner*—James R. Brittain
(74) *Attorney, Agent, or Firm*—Dennis J. M. Donahue, III; Grant D. Kang; Husch & Eppenberger LLC

(57) ABSTRACT

A mounting hook for a wire array mountable on a seat frame has a first portion having a seating member running longitudinally along the first portion, a second portion having a channel running across the top of the hook and outboard of the hooking surface, and a hooking member running transversely to the channel and parallel to the seating member. The first, second and third portions define a hooking surface. A method of seat assembly consists of a wire array connecting to mounting hooks by running a mounting wire through the wire seating member of the mounting hook. Such wire is then bent to a transverse angle. After such wire is bent, the mounting hook is slid to the bent area. The bent area is then placed into the channel. The wire array is then ready for mounting on the seat frame through the use of the hooks.

42 Claims, 2 Drawing Sheets

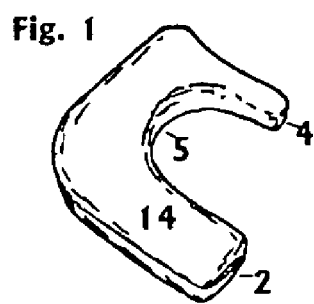
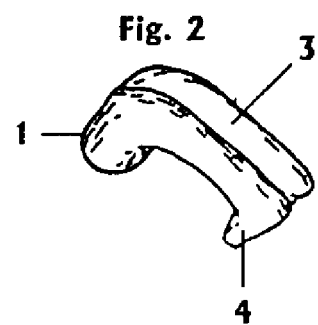
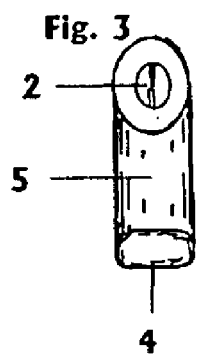
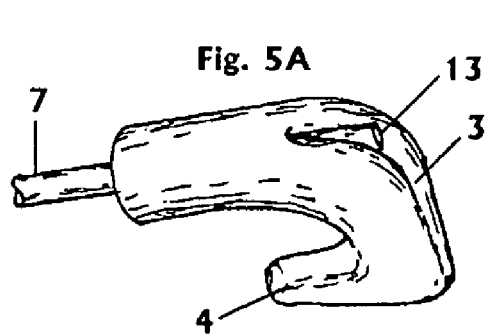
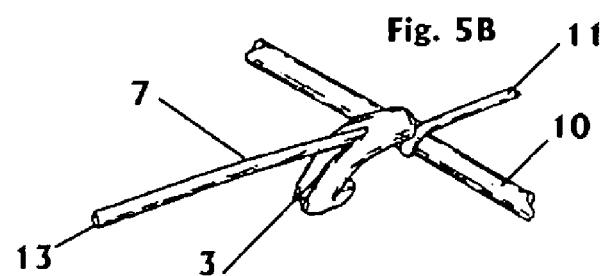
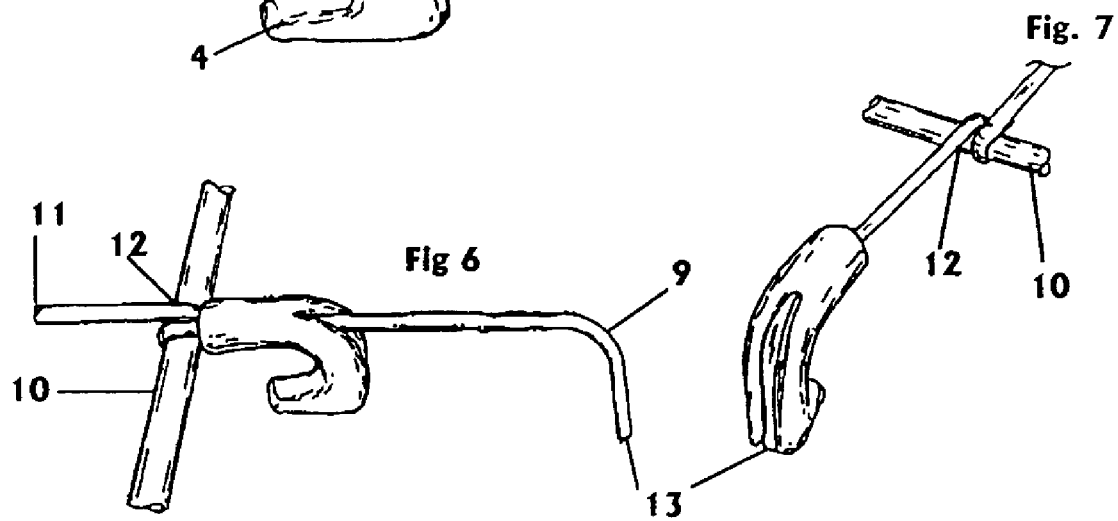
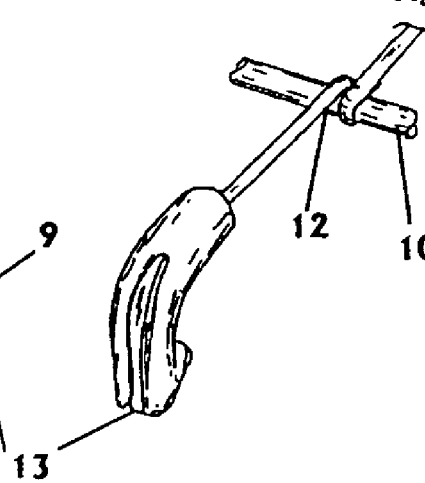

MOUNTING HOOK AND WIRE ARRAY APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to the seat assembly process and, more particularly, to improvements in the seat suspension mounting process utilized in automotive seat assembly.

2. Related Art

A common problem in the field of seat manufacturing is noise and vibration resulting from the connection between the seating suspension and the seat frame. Normally, when a seat is assembled, a suspension wire array is connected to the seat frame by bending the connecting wires into hooks. These hooks are then hooked onto the seat frame. However, with this type of connection, a noise and vibration problem can develop from the two metals rubbing against each other especially when force is exerted upon the seat. In order to solve this problem, the prior art teaches to coat the connecting wires with a plastic or rubber type coating. This coating helps to prevent the noise and vibration problems. However, in using this coating, significant amounts of time and money are often spent shipping the wire arrays offsite to have this process completed. There is a need in the art for less expensive, quicker mounting of wire suspension arrays on seat frames in a way that reduces noise and vibration problems.

SUMMARY OF THE INVENTION

It is in view of the above problems that the present invention was developed. A suspension wire array assembly using plastic mounting hooks alleviates noise and vibration problems and does so quickly, and at low cost.

The invention consists of mounting hooks made of plastic. These mounting hooks feature a first portion having a wire seating member for connection with a mounting wire. In the depicted embodiment, the wire seating member is a through hole. Other embodiments of a wire seat can include a channel, groove, or a strap. A second portion of the mounting hook runs transversely to the seating member. Along the top of the mounting hook and extending the entire length of the second portion is an aperture. In the preferred embodiment, this aperture is a channel. The aperture receives a transversely bent mounting wire end to keep the hook in a rotationally fixed position. A third portion of the mounting hook contains a hooking member.

This mounting hook can be used in connection with a wire array in the seat assembly process. The wire array consists of a "flexmat" member defined by a strong border wire with horizontal and/or vertical inner supporting wires running transversely throughout the border created by the border wire. At certain intervals, mounting wires extend from the border wire and enable the flexmat member to be connected to the seat frame.

The invention also includes a process of mounting a wire array on a seat frame with the use of the aforementioned mounting hooks. As the wire array is being prepared for mounting on the seat frame, a plastic mounting hook is placed on the mounting wire. The wire is inserted through the wire seating through hole running along the first portion of the hook. After the wire is inserted through this hole, the plastic mounting hook is moved towards the wire array and away from the wire end. The wire is then bent at a transverse angle forming a wire bend. The plastic mounting hook is moved from its position near the array to this bend. The wire bend prevents the hook from sliding off the mounting wire. The direction of the bend is selected to useful for mounting the wire array, for example perpendicular to the plane of the wire array.

The mounting hook also features an aperture or channel on the top portion of the hook. The bent wire is positioned in the channel. The channel allows for the wire bend to fit flush with the hook and prevents the hook from rotating around the wire. After the hook is slid to the wire bend and the wire bend is inserted into the channel, the hook is fastened to the seat framing structure. The use of the plastic mounting hooks prevents noise and vibration problems while providing the same hooking function as the previous method. Additionally, the use of this mounting process provides a simple method for assembling the seats that is less expensive than the previous solutions like coating.

Another feature of this invention is the ability to use this process and hook assembly with several seat models and sizes. Before the mounting hook is placed on the mounting wire, the mounting wire can be cut or adapted to an appropriate length and configuration to fit the various size requirements for an individual seat. From that point, the mounting hooks are then placed on the shortened mounting wire and the process continues as described above.

The mounting process using the wire array with the mounting hooks is intended for use in substantially any type of seat assembly process. The individual mounting hooks can also be used in any mounting process and are not limited to use with the wire array or to the seat assembly process. While the wire array combined with mounting hooks is primarily intended for use in automotive seat manufacturing, it can also be used for other purposes such as a support element in a bed mattress.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 1 illustrates an oblique side view of the mounting hook.

FIG. 2 illustrates an oblique top view of the mounting hook.

FIG. 3 illustrates a bottom view of the mounting hook.

FIG. 5A illustrates the mounting hook during assembly.

FIG. 5B illustrates the mounting wire and mounting hook during assembly.

FIG. 6 illustrates the mounting wire and mounting hook at a later time during assembly.

FIG. 7 illustrates the mounting hook with the wire bend placed into the channel.

DETAILED DESCRIPTION OF THE PREFERRED EMBODIMENTS

Figure 4:
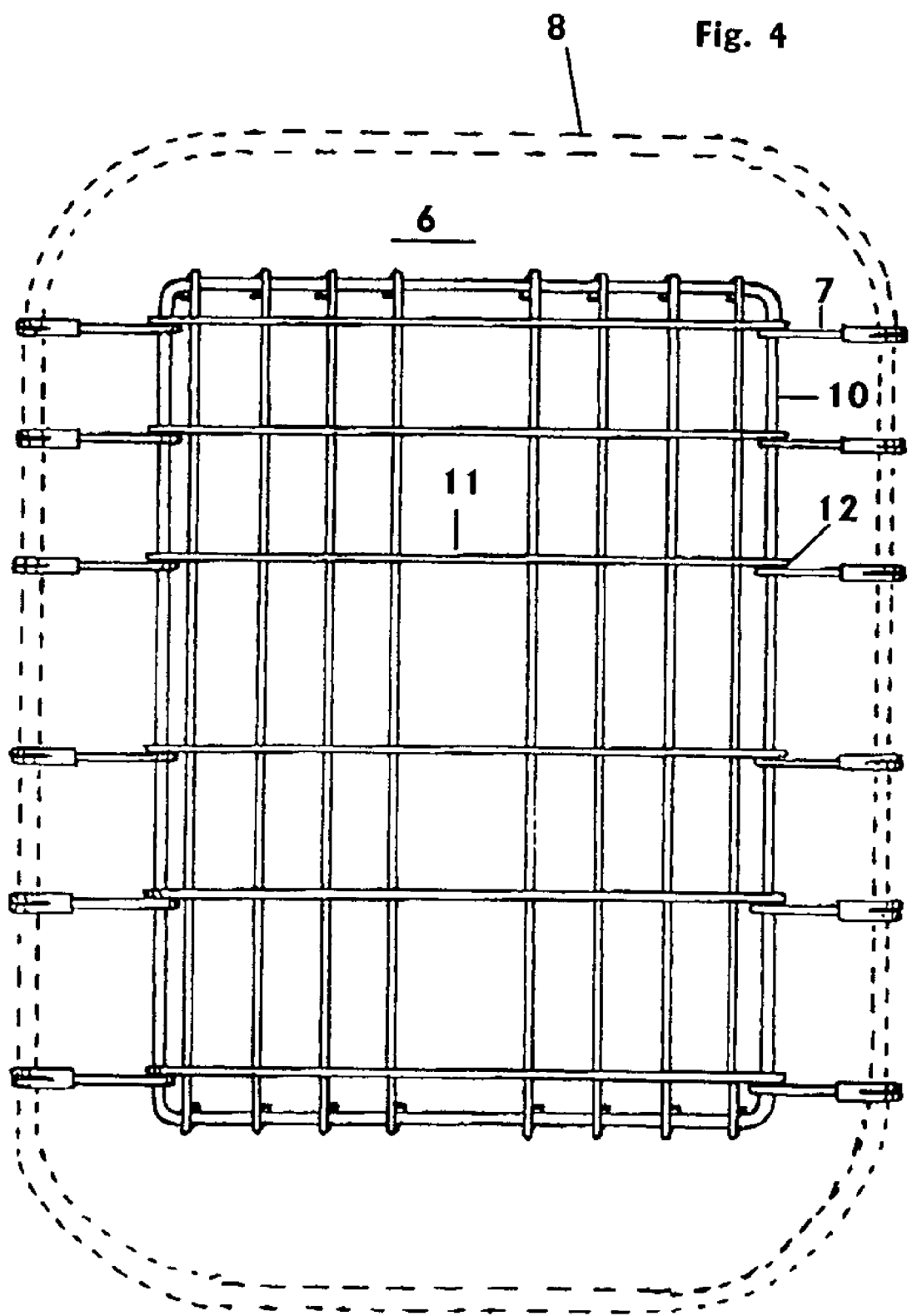
FIG. 4 illustrates the wire array used in the mounting process.

Referring to the accompanying drawings in which like reference numbers indicate like elements, FIGS. 1–3 illustrate the mounting hook. As seen in the figures, the hook 1 has a wire seating member 2 running longitudinally down a first portion or shaft 14 of the hook. In the depicted embodiment the wire seating member 2 is a through hole. This wire seating member 2 is used for connecting the mounting wire 7 to the mounting hook 1. While this member provides a strong connection between the mounting hook and the mounting wire, it still allows the hook to slide along the mounting wire. This embodiment features the wire seating member as a through hole but any embodiment that keeps the wire connected to the hook and still allows for sliding movement is sufficient. Other possible embodiments of this member could include a channel or groove.

A second feature is the hooking surface 5 on the underside of a second portion of the mounting hook 1. The hooking surface 5 may be curved. This hooking surface 5 provides the surface at which the mounting hook 1 will engage the seat frame 8. A channel 3 runs on the top side of the hook 1, running transversely to the wire seating member 2 and outboard of the hooking surface 5. This channel 3 will prevent the mounting hook 1 from rotating around the mounting wire 7 after the wire bend 9 is placed within the channel 3. This portion of the hook is not limited to a channel. Any embodiment that is capable of receiving the bent, transverse wire end of the mounting wire and that keeps the hook rotationally still is sufficient. Other possible embodiments for this portion of the mounting hook include a through hole or a strap.

Finally, a third portion is a hooking member 4 that runs transversely to the channel 3 and parallel with the wire seating member 2. The hooking member 4 prevents the mounting hook 1 from accidentally disengaging from the seat frame 8 when pressure is applied to the wire array 6. The hooking member 4 is connected to the wire seating member 2 by the channel 3 and the hooking surface 5.

FIG. 4 shows the wire array 6 used in this invention. The wire array 6 consists of a "flexmat" member defined by a strong outer border wire 10 and a plurality of inner supporting wires 11 running transversely throughout the configuration formed by the border wire. The inner wires 11 are assembled in such a configuration as to provide the most passenger support for the seat. At certain intervals 12 along the border wire 10, mounting wires 7 extend from the wire array 6 for connection to the seat frame 8. These mounting wires may be bent to extend from the wire array at certain predetermined angles for adapted use in the mounting process. This also allows for more diverse utilization of the wire array in areas other than automotive seat manufacturing. At the ends of the mounting wires 7 are wire ends 13. These wire ends 13 are eventually bent to a transverse angle in the mounting process so that the mounting hook 1 is prevented from sliding off the mounting wire 7.

FIGS. 5–7 show stages of the method for mounting the wire array using the mounting hooks. The mounting wire 7 is inserted into the wire seating member 2 with the channel 3 facing away from the wire array 6. The mounting hook 1 is slid along the mounting wire 7 to a position near the border wire 10 of the wire array 6. Next, the wire end 13 of the mounting wire 7 is bent to a transverse angle forming a wire bend 9. The mounting hook 1 is then slid to the wire bend 9 and the wire bend 9 is placed into the channel 3. When all the mounting wires 7 have hooks installed, the wire array 6 is ready to attach to the seat frame 8.

In view of the foregoing, it will be seen that the several advantages of the invention are achieved and attained. The wire array with mounting hooks and the mounting process can be used in any seat assembly system. In order to adapt the wire array to various sizes and models of seats, the mounting wires simply need to be cut to an appropriate length and the mounting process can continue as described above.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the mounting hooks can be made of any material. This invention is not limited to the use of plastic mounting hooks only. Any material that reduces or eliminates the metal to metal connection will suffice. Such materials may include polyurethane, wood, rubber, graphite, or fiberglass. Similarly, the border wire and the inner supporting wires can be made of a variety of materials including but not limited to polyurethane, wood, rubber, graphite, nylon, cloth, fiberglass, or metal. The wire array can also take the form of any shape as long as there is an outer border wire and inner supporting wires. The invention is not limited to the design of the supporting wires illustrated in the drawings but can take any configuration. Thus, the breadth and scope of the present invention should not be limited by any of the above-described exemplary embodiments, but should be defined only in accordance with the following claims appended hereto and their equivalents.

What is claimed is:

1. A mounting hook comprising:
   a first portion having a wire seating member, wherein said wire seating member is comprised of a longitudinally extending shaft with a bore extending the longitudinal length of said shaft wherein said bore has an entrance opening and an exit opening;
   a second portion substantially transverse to said first portion and having an aperture;
   a third portion substantially transverse to said second portion and substantially parallel to said first portion; and
   said first and third portions being disposed on substantially the same side of said second portion.

2. A mounting hook, as set forth in claim 1, wherein said exit opening terminates prior to said second portion.

3. A mounting hook, as set forth in claim 1, wherein said third portion is a hooking member.

4. A mounting hook, as set forth in claim 1, wherein said mounting hook is made of plastic.

5. A mounting hook, as set forth in claim 1, wherein said aperture is a channel, said channel running longitudinally along said second portion.

6. A mounting hook, as set forth in claim 1, wherein said aperture is a through hole, said through hole running longitudinally through said second portion.

7. A mounting hook, as set forth in claim 1, wherein said mounting hook is made of a material selected from the group consisting of polyurethane, wood, rubber, graphite, and fiberglass.

8. A mounting hook as set forth in claim 1, wherein said second portion has a wire channel running longitudinally along the entire length of said second portion.

9. A mounting hook, as set forth in claim 8, wherein said third portion is a hooking member.

10. A mounting hook, as set forth in claim 8, wherein said mounting hook is made of plastic.

11. A mounting hook, as set forth in claim 8, wherein said mounting hook is made of a material selected from the group consisting of polyurethane, wood, rubber, graphite, and fiberglass.

12. A mounting hook, as set forth in claim 8, wherein said second portion of said mounting hook has a first side and a second side opposite said first side, said first side having a hooking surface, said second side having said channel opening away from said first side.

13. A mounting hook comprising:
a first portion having a wire seating member;
a second portion substantially transverse to said first portion, said second portion having a first side and a second side opposite said first side, said first side having a hooking surface, said second side having a channel opening away from said first side;
a third portion substantially transverse to said second portion and substantially parallel to said first portion; and
said first and third portions being disposed on substantially the same side of said second portion.

14. A mounting hook, as set forth in claim 13, wherein said third portion is a hooking member.

15. A mounting hook, as set forth in claim 13, wherein said mounting hook is made of plastic.

16. A mounting hook, as set forth in claim 13, wherein said wire seating member is comprised of a longitudinally extending shaft with a bore extending the longitudinal length of said shaft wherein said bore has an entrance opening and an exit opening.

17. A mounting hook, as set forth in claim 16, wherein said exit opening terminates prior to said second portion.

18. A mounting hook, as set forth in claim 13, wherein said mounting hook is made of a material selected from the group consisting of polyurethane, wood, rubber, graphite, and fiberglass.

19. A mounting hook, as set forth in claim 13, wherein said channel runs longitudinally along the entire length of said second portion.

20. A mounting hook, as set forth in claim 13, wherein said wire seating member of said mounting hook has portions defining a through hole running longitudinally through said first portion of said mounting hook for receiving a mounting wire.

21. A wire array mountable on a seat frame comprising:
a flexmat member wherein said flexmat member is composed of a border wire and a plurality of inner supporting wires running throughout the configuration made by said border wire;
a plurality of mounting wires extending from said border wire; and,
a plurality of mounting hooks attached to said mounting wires wherein said mounting hooks contain:
a first portion having a wire seating member;
a second portion substantially transverse to said first portion, said second portion having a first side and a second side opposite said first side, said first side having a hooking surface, said second side having a channel opening away from said first side;
a third portion substantially transverse to said second portion and substantially parallel to said first portion; and
said first and third portions being disposed on substantially the same side of said second portion.

22. A wire array, as set forth in claim 21, wherein said channel of said mounting hooks runs longitudinally along the entire length of said second portion.

23. A wire array, as set forth in claim 21, wherein said wire seating member of said mounting hooks is comprised of a longitudinally extending shaft with a bore extending the longitudinal length of said shaft wherein said bore has an entrance opening and an exit opening.

24. A wire array, as set forth in claim 23, wherein said exit opening terminates prior to said second portion.

25. A wire array, as set forth in claim 21, wherein said wire seating member of said mounting hook has portions defining a through hole running longitudinally through said first portion of said mounting hook for receiving said mounting wire.

26. A wire array, as set forth in claim 21, wherein said third portion of said mounting hook is a hooking member.

27. A wire array, as set forth in claim 21, wherein said wire array is a support element in a bed mattress.

28. A wire array, as set forth in claim 21, wherein said mounting hooks are made of a material selected from the group consisting of polyurethane, wood, rubber, graphite, fiberglass, and plastic.

29. A wire array, as set forth in claim 21, wherein said mounting wires extend at predetermined angles from said border wire.

30. A method of assembling a wire array adapted for mounting on a seat frame comprising the steps of:
providing a mounting hook comprising a first portion having a wire seating member, a second portion substantially transverse to said first portion, a third portion substantially transverse to said second portion and substantially parallel to said first portion and said first and third portions being disposed on substantially the same side of said second portion, wherein said second portion is further comprised of a first side and a second side opposite said first side, said first side having a hooking surface, said second side having a channel opening away from said first side;
inserting a mounting wire into said wire seating member in said mounting hook;
sliding said mounting hook away from a wire end; bending said wire end to a transverse angle forming a wire bend; and,
seating said wire bend in said channel in said mounting hook.

31. The method as set forth in claim 30, comprising the further step of:
configuring a mounting wire to engage a seat frame.

32. The method as set forth in claim 30, comprising the further step of:
configuring a mounting hook to engage a seat frame.

33. The method as set forth in claim 30, comprising the further step of:
bending a mounting wire to a predetermined angle prior to the first inserting step.

34. A wire array mountable on a seat frame comprising:
a flexmat member wherein said flexmat member is composed of a border wire and a plurality of inner supporting wires running throughout the configuration made by said border wire;
a plurality of mounting wires extending from said border wire; and,
a plurality of mounting hooks attached to said mounting wires wherein said mounting hooks contain:
  a first portion having a wire seating member, wherein said wire seating member is comprised of a longitudinally extending shaft with a bore extending the longitudinal length of said shaft wherein said bore has an entrance opening and an exit opening;
  a second portion substantially transverse to said first portion and having an aperture;
  a third portion substantially transverse to said second portion and substantially parallel to said first portion; and
  said first and third portions being disposed on substantially the same side of said second portion.

35. A wire array, as set forth in claim 34, wherein said aperture of said second portion of said mounting hooks is a channel.

36. A wire array, as set forth in claim 35, wherein said channel of said mounting hooks runs longitudinally along the entire length of said second portion.

37. A wire array, as set forth in claim 35, wherein said second portion of said mounting hooks has a first side and a second side opposite said first side, said first side having a hooking surface, said second side having a channel opening away from said first side.

38. A wire array, as set forth in claim 34, wherein said exit opening terminates prior to said second portion.

39. A wire array, as set forth in claim 34, wherein said third portion of said mounting hook is a hooking member.

40. A wire array, as set forth in claim 34, wherein said wire array is a support element in a bed mattress.

41. A wire array, as set forth in claim 34, wherein said mounting hooks are made of a material selected from the group consisting of polyurethane, wood, rubber, graphite, fiberglass, and plastic.

42. A wire array, as set forth in claim 34, wherein said mounting wires extend at predetermined angles from said border wire.

* * * * *